(12) United States Patent
Manpo

(10) Patent No.: US 8,712,346 B2
(45) Date of Patent: Apr. 29, 2014

(54) TRANSMISSION DEVICE

(75) Inventor: Mitsuhiko Manpo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 3 days.

(21) Appl. No.: 13/419,256

(22) Filed: Mar. 13, 2012

(65) Prior Publication Data

US 2012/0238225 A1 Sep. 20, 2012

(30) Foreign Application Priority Data

Mar. 20, 2011 (JP) ................................. 2011-061830

(51) Int. Cl.
*H04B 17/00* (2006.01)

(52) U.S. Cl.
USPC ..................................... 455/115.1; 455/127.1

(58) Field of Classification Search
CPC ............... H03F 1/56; H03F 2200/387; H03F 2200/393; H03F 1/0458; H03F 7/12
USPC ............... 455/115.1, 127.1, 91, 552.1, 127.2, 455/522; 330/285, 305; 343/702.861, 860
See application file for complete search history.

(56) References Cited

U.S. PATENT DOCUMENTS

| | | | |
|---|---|---|---|
| 5,774,062 A | 6/1998 | Ikefuji | |
| 6,985,113 B2 * | 1/2006 | Nishimura et al. | 343/702 |
| 7,663,555 B2 * | 2/2010 | Caimi et al. | 343/702 |
| 7,741,912 B1 * | 6/2010 | Nadimpalli | 330/285 |
| 8,041,315 B2 * | 10/2011 | Hamalainen et al. | 455/127.1 |
| 8,130,735 B2 * | 3/2012 | Rofougaran | 370/338 |
| 8,395,459 B2 * | 3/2013 | Spears et al. | 333/17.3 |

FOREIGN PATENT DOCUMENTS

| | | | |
|---|---|---|---|
| JP | 07-321697 A | 12/1995 |
| JP | 2000-341142 A | 12/2000 |
| JP | 2006-148523 A | 6/2006 |
| JP | 2007-266758 A | 10/2007 |

OTHER PUBLICATIONS

Extended European Search Report dated Jul. 9, 2012 as received in application No. 12159340.4.

* cited by examiner

*Primary Examiner* — Sonny Trinh
(74) *Attorney, Agent, or Firm* — Maschoff Brennan

(57) ABSTRACT

A transmission device, includes an amplifying unit which amplifies and outputs a modulation signal, a detecting unit which detects an output power of the amplifying unit, an output power changing unit which changes the output power of the amplifying unit based on an output of the detecting unit, and a control unit which controls an input impedance of the detecting unit based on each communication method.

8 Claims, 7 Drawing Sheets

| FREQUENCY BAND [Hz] | C2 [pF] | C3 [pF] | CORRECTION VALUE [V] | DETECTION VOLTAGE [V] | |
|---|---|---|---|---|---|
| | | | | OUTPUT OF AMPLIFYING UNIT =26.5dBm | OUTPUT OF AMPLIFYING UNIT =15dBm |
| 800M | 1.5 | 0.45 | 0 | 1.5 | 1.26 |
| 2G | 1.5 | 105 | A | | |
| 2.5G | 1.95 | 105 | B | | |

52, 53, 59, 54, 55, 56, 57, 58

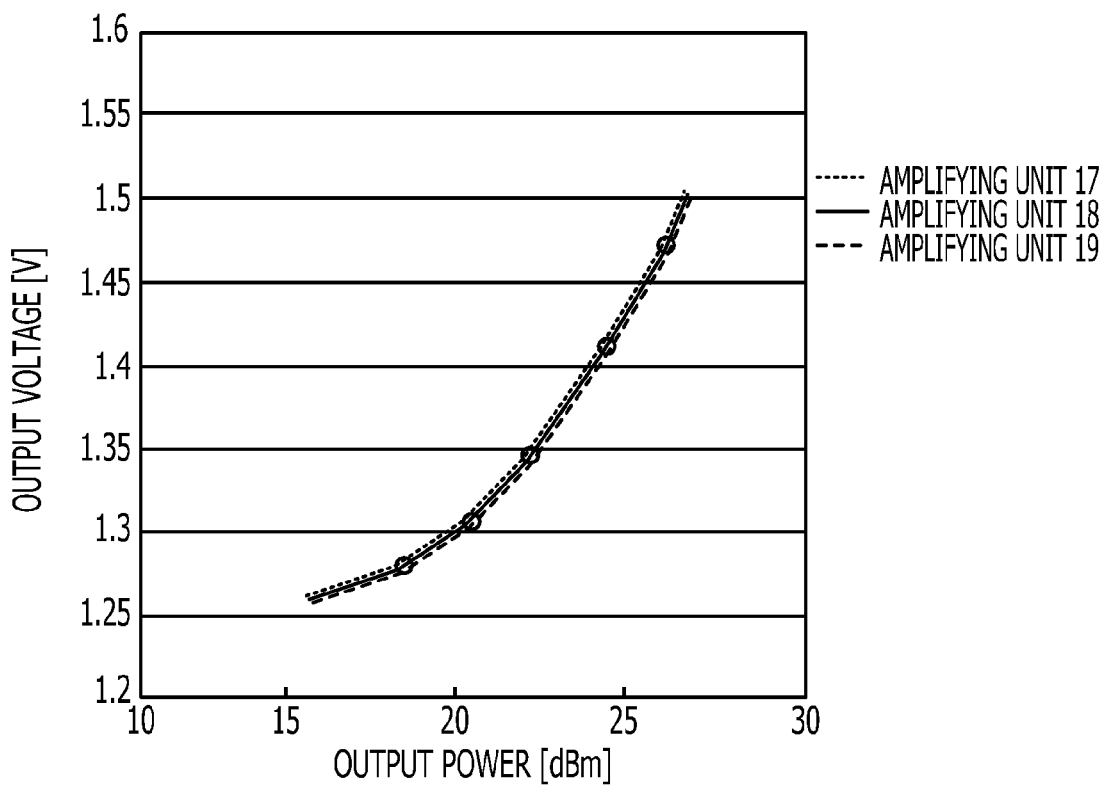

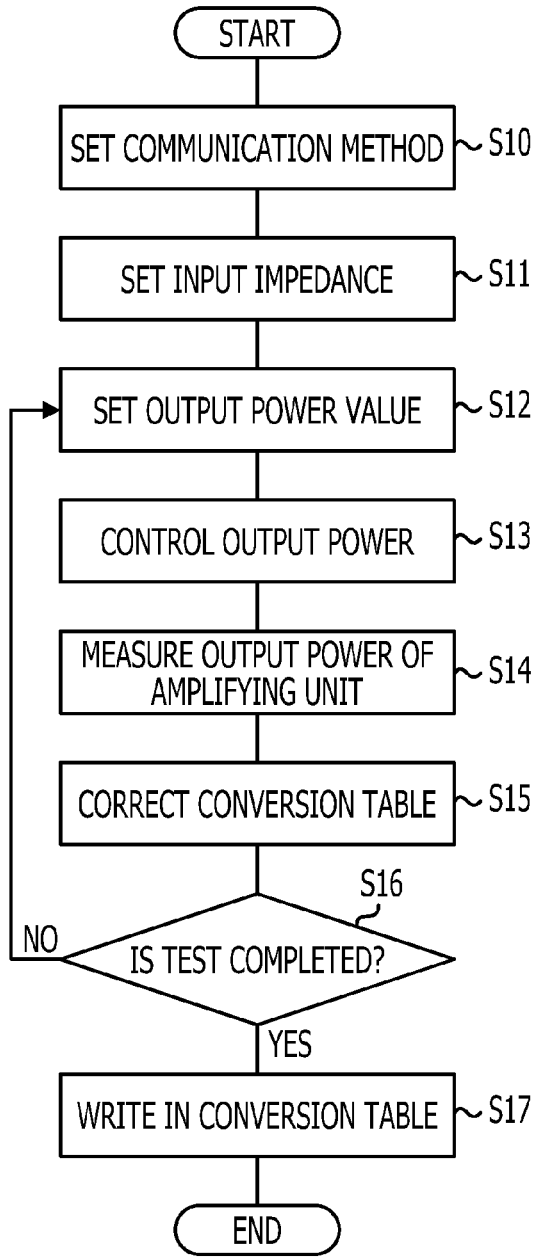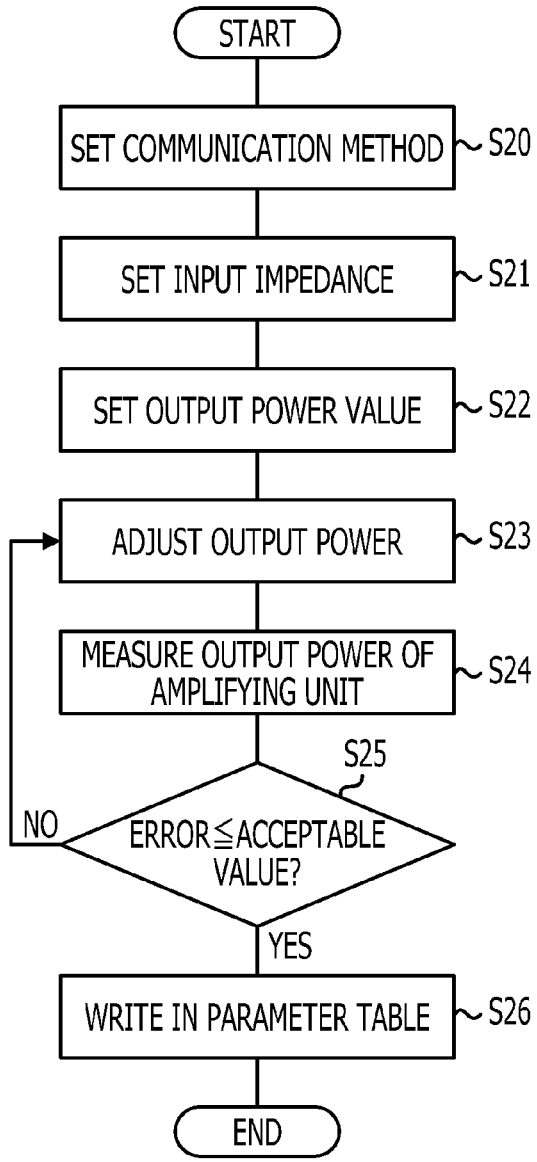

TRANSMISSION DEVICE

CROSS-REFERENCE TO RELATED APPLICATIONS

This application is based upon and claims the benefit of priority from the prior Japanese Patent Application No. 2011-61830 filed on Mar. 20, 2011 the entire contents of which are incorporated herein by reference.

FIELD

The embodiments discussed herein area related to a transmission device that amplifies a modulation signal and radio-transmits the modulation signal.

BACKGROUND

A transmission device that is mounted on a mobile terminal amplifies a modulation signal and radio-transmits the modulation signal. According to a communication method, the transmission device changes a transmission power if desired.

The transmission device includes an amplifying unit, which amplifies a modulation signal, and a level detecting unit, which detects an output power of the amplifying unit. The transmission device includes a unit that controls the output power of the amplifying unit according to the output of the level detecting unit. Based on the output of the level detecting unit, the control unit adjusts the strength of the modulation signal that is to be input into the amplifying unit.

In recent years, there has been various communication methods, and there is a transmission device that performs transmission of a plurality of several communication methods and frequency bands. In most cases, the level detecting unit is formed with a filter that removes a waved high frequency component that is rectification-detected with a diode that rectification-detects the output of the amplifying unit. Therefore, an input impedance as an impedance corresponding to the input of the level detecting unit includes a frequency property. As a result, even if the output power value of the amplifying unit as a detection target of the level detecting unit is equivalent to the output power value of the level detecting unit, the output of the level detecting has a different value if the frequency bands are different from each other.

Japan Laid-open Patent Publication No. 2007-266758 and Japan Laid-open Patent Publication No. 2000-341142 disclose a technique for adjusting an output of the level detecting unit in a case where the communication method is switched.

The above-described transmission device stores a correspondence relation between the output power of the amplifying unit and the output of the level detecting unit for each communication method. Based on the stored content, the above-described transmission device may correspond to a relation between the output of the level detecting unit and the transmission output.

However, the transmission device has an individual difference of the amplifying unit. If the above-described method is employed, the transmission device measures the correspondence relation between the transmission output and the output of the level detecting unit, respectively, at the shipping time. Each operation is typically performed by the transmission device to store each of the values. In particular, the transmission device corresponding to the above-described communication methods stores measurement results of the correspondence relation between the transmission output and the level detecting unit in the range of the assumed transmission output in the storage unit, so that the operation procedures are increased.

An aspect of the present invention is to provide a transmission device that is able to simplify the adjustment of the output power at the shipping even though the transmission device may correspond to the plurality of communication methods.

SUMMARY

According to an aspect of the invention, a transmission device, includes an amplifying unit which amplifies and outputs a modulation signal, a detecting unit which detects an output power of the amplifying unit, an output power changing unit which changes the output power of the amplifying unit based on an output of the detecting unit, and a control unit which controls an input impedance of the detecting unit based on each communication method.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 4 is a parameter table diagram illustrating a circuit parameter of the adjusting unit;

FIG. 5A is a diagram of a relation between an output power of the amplifying unit and an output voltage of the level detecting unit;

FIG. 5B is a conversion table diagram used to convert an output voltage value of the level detecting unit into an output power value;

FIG. 6A is a test processing flow diagram of a test device according to a first communication method;

FIG. 6B is a test processing flow diagram of the test device according to the communication methods after a second communication method.

DETAILED DESCRIPTION OF THE PREFERRED EMBODIMENTS

Embodiments will be described below. Configuration combinations of each embodiment are included in the embodiments of the present invention.

Figure 1:
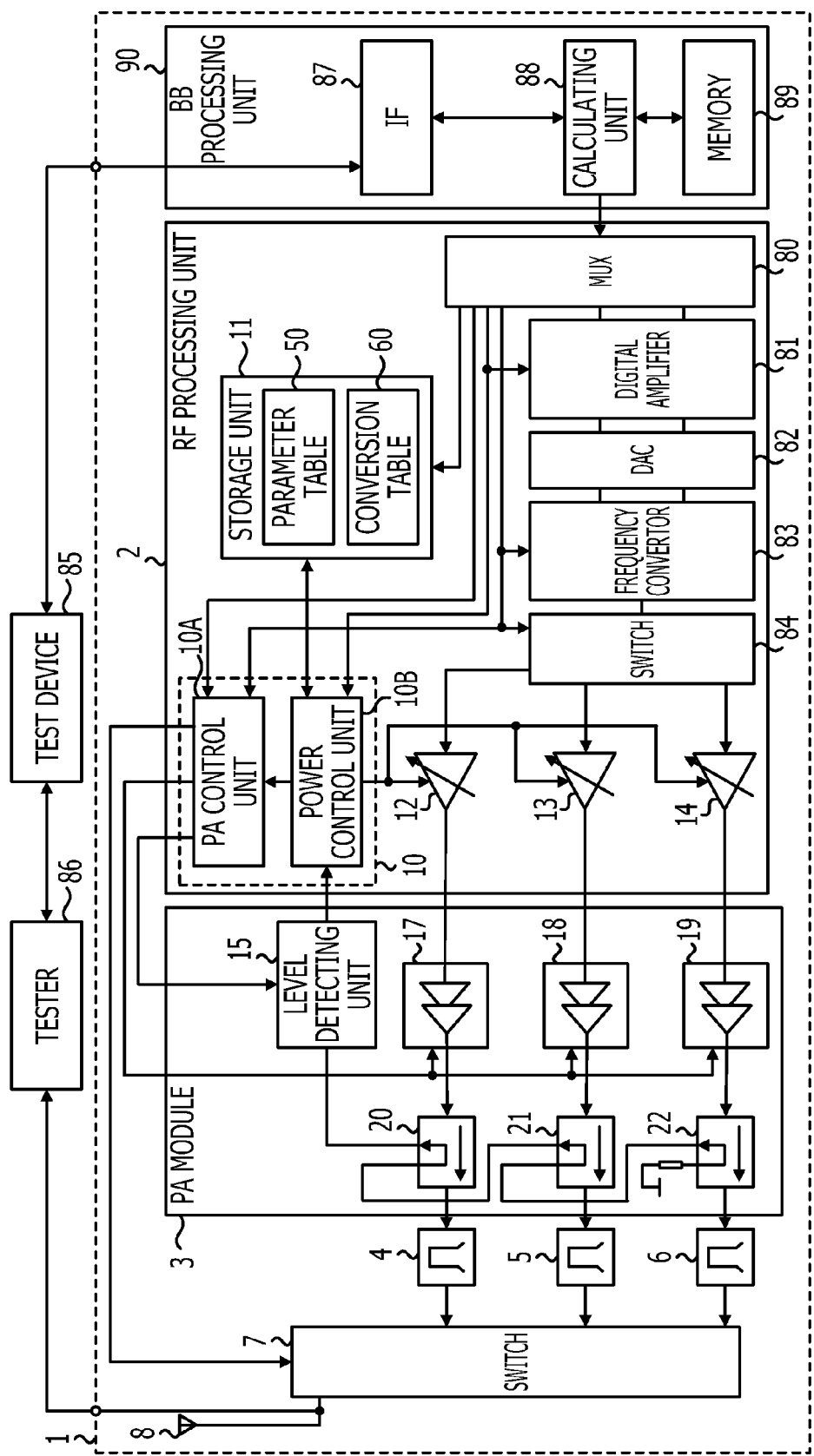
FIG. 1 is a block diagram of a test system that includes a transmission device according to the present embodiment.

FIG. 1 is a block diagram of a test system for testing an output power of a transmission device 1 at shipping. The test system includes the transmission device 1 that is to be tested, a tester 86, and a test device 85.

The transmission device 1 includes a Base Band (BB) processing unit 90, a Radio Frequency (RF) processing unit 2, a Power Amplifier (PA) module 3, filters 4, 5, and 6, a switch 7, and an antenna 8. According to a selected communication method, the BB processing unit 90 performs digital processing on transmission data and outputs the transmission data to the RF processing unit 2. The RF processing unit 2 performs modulation processing on a digital signal output from the BB processing unit by a frequency that is selected according to the communication method and outputs the modulation signal of which the signal strength is adjusted to the PA module 3. The PA module 3 amplifies the demodulation signal that is output from the RF processing unit 2. The filters 4, 5, and 6 remove noise of the modulation signal output from the PA module 3. The output of any of the filters 4, 5, and 6 is coupled with the antenna 8 by the switch 7. The antenna 8 outputs the modulation signal.

The BB processing unit 90 includes an Inter Face (IF) 87, a calculating unit 88, and a memory 89. The IF 87 outputs a test result input from the test device 85 to the calculating unit 88. The calculating unit 88 writes the input test result in the memory 89. According to the selected communication method, the calculating unit 88 outputs, to the RF processing unit 2, the digital signal that is subjected to signal processing and a signal that performs operation setting of the transmission device 1.

The RF processing unit 2 includes a Multiplexer (MUX) 80, a digital amplifier 81, a Digital Analog Convertor (DAC) 82, a frequency convertor 83, a switch 84, a control unit 10, a storage unit 11, and Voltage Gain Amplifiers 12, 13, and 14. The PA module 3 includes amplifying units 17, 18, and 19, directional coupling units 20, 21, and 22, and a level detecting unit 15.

The MUX 80 converts a serial signal output from the calculating unit 88 into a parallel signal. The converted parallel signal includes table information that is written in the storage unit 11, a PA setting signal that sets the operation of the PA module 3, a power setting signal that sets the output power of the transmission device 1, a selection signal that selects a communication method according to the communication method, and an I/Q signal that is to be transmitted.

The table information output from the calculating unit 88 is input into the storage unit 11 through the MUX 80. The PA setting signal output from the calculating unit 88 is input into the control unit 10 through the MUX 80. The power setting signal output from the calculating unit 88 is input into the control unit 10 and the digital amplifier 81 through the MUX 80. The selection signal output from the calculating unit 88 is input into the frequency convertor 83, the switch 84, and the control unit 10 through the MUX 80. The I/Q signal output from the calculating unit 88 is input into the digital amplifier 81 through the MUX 80.

The digital amplifier 81 amplifies an amplitude of the I/Q signal according to the power setting signal. The DAC 82 converts the I/Q signal output from the digital amplifier 81 into an analog signal. The frequency convertor 83 selects a frequency based on the selection signal. Based on the selected frequency, the frequency convertor 83 mixes the I/Q signal and outputs the modulation signal. Based on the power setting signal, the switch 84 switches the output destination of the modulation signal to one of the VGAs 12, 13, and 14.

Based on the instruction of the calculating unit 88, the VGAs 12, 13, and 14 are output power changing units that change the output power of the modulation signal to be output to the PA module 3. According to the embodiment, the VGA 12 is an output power changing unit that changes the output power of the modulation signal of 800 MHz band. The VGA 13 is an output power changing unit that changes the output power of the modulation signal of 2 GHz band. The VGA 14 is an output power changing unit that changes the output power of the modulation signal of 2.5 GHz band.

The control unit 10 includes a PA control unit 10A and a power control unit 10B. The PA control unit 10A performs operation control of the PA module 3 according to the PA setting signal output from the MUX 80. According to the power setting signal that is output from the calculating unit 88 and is then input through the MUX 80, the power control unit 10B changes the strength of the modulation signal output from the VGAs 12, 13, and 14.

Based on the PA setting signal that is output from the calculating unit 88 and is then input through the MUX 80, the PA control unit 10A adjusts the circuit parameter of the level detecting unit 15 in such a way that the value of the output voltage of the level detecting unit 15 remains substantially the same if the output power of the amplifying unit remains substantially the same. By adjusting the input impedance for each communication method, the voltage value output from the level detecting unit 15 may remain substantially the same regardless of the communication method.

Based on the conversion table 60 stored in the storage unit 11, the power control unit 10B converts the voltage value output from the level detecting unit 15 into an output power of the amplifying unit. The power control unit 10B compares the power set value based on the power set signal, which is output from the calculating unit 88 and is then input through the MUX 80, to the output power value of the amplifying unit obtained by converting processing. The power control unit 10B outputs the control signal that adjusts the strength of the modulation signal output from the VGAs 12, 13, and 14 in such a way that the output power value of the amplifying unit obtained by the converting processing becomes a power set value. The output power value of the amplifying unit indicates a peak value of the output power. The output power value may be the average value of the output power. By repeating the above-described feedback processing, the transmission device 1 may make the amplifying unit output the set power.

Based on the conversion table 60, the power set value based on the power set signal, which is output from the calculating unit 88 and is then input through the MUX 80, may be converted into a voltage value in advance. As a result, the voltage value may be compared to the set value even though the output voltage value of the level detecting unit 15 is not converted into the output power value of the amplifying unit.

The storage unit 11 stores a parameter table 50 and a conversion table 60. The parameter table 50 stores the set value of the input impedance that is set to the level detecting unit 15 for each communication method. The set value of the input impedance stored in the parameter table 50 is calculated in advance by simulation or the like. The conversion table 60 includes the conversion value that is obtained by converting the voltage value output from the level detecting unit 15 into the output power value of the amplifying unit. When the power of the mobile terminal is applied, the calculating unit 88 reads out the information stored in the memory 89 and overwrites the information on the information stored in the storage unit 11.

The amplifying unit 17 amplifies the modulation signal output from the VGA 12. The amplifying unit 18 amplifies the modulation signal output from the VGA 13. The amplifying unit 19 amplifies the modulation signal output from the VGA 14. According to the control signal output from the PA control unit 10A, the amplifying units 17, 18, and 19 activate any of the output.

The directional coupling units 20, 21, and 22 output part of the output of the amplifying units 17, 18, and 19 to the level detecting unit 15. The directional coupling units 20, 21, and 22 include a main line part that is coupled with the output of the amplifying units 17, 18, and 19 and an auxiliary line part that is electrically coupled with the main line unit. The main line part of the directional coupling unit 20 is coupled with the 17. The main line part of the directional coupling unit 21 is coupled with the amplifying unit 18. The main line part of the directional coupling unit 22 is coupled with the amplifying unit 19. One of the auxiliary line parts of the directional coupling units 20, 21, and 22 is coupled with the level detecting unit 15. The other auxiliary line part of the directional coupling units 20, 21, and 22 is terminated.

Based on the output of the auxiliary line part of the directional coupling units 20, 21, and 22, the level detecting unit 15 outputs the voltage to the power control unit 10B. According to the control signal output from the PA control unit 10A, the level detecting unit 15 adjusts the input impedance.

The filters 4, 5, and 6 are band-path filters corresponding to the frequency band of each of the modulation signals from the amplifying units 17, 18, and 19, which are output through the directional coupling units 20, 21, and 22, and remove the frequency component other than the frequency band of the modulation signal.

The switch 7 selects one of the modulation signals output from the filters 4, 5, and 6 and outputs the modulation signal to the antenna 8. Switching of the switch 7 is performed based on the control signal output from the PA control unit 10A.

The antenna 8 is a multi-band antenna corresponding to a plurality of communication methods. The antenna 8 is not limited to the multi-band antenna. A plurality of antennas corresponding to each communication method may be coupled with an output side if each of the filters. In this case, the switch 7 for switching the coupling relation between the antenna 8 and the filters 4, 5, and 6 is not typically provided.

The tester 86 measures the power input into the antenna 8 and outputs the measurement result to the test device 85. The test device 85 sets the tester 86 and outputs the measurement result of the power output from the tester 86 to the transmission device 1. The test device 85 and the tester 86 are coupled with the transmission device 1 at the shipping test. After the shipping test, the test device 85 and the tester 86 are removed from the transmission device 1.

As described above, regarding the test of the transmission device 1, the test device 85 sets test conditions of the transmission device 1 and measures the reply by using the tester 86.

According to the present embodiment, the transmission device includes a plurality of VGAs and a plurality of amplifying units to perform a plurality of communication methods. The transmission device may include a single VGA and a single amplifying unit corresponding to the plurality of communication methods. In this case, a switch is provided in the output of the amplifying unit to switch the filter in the coupling destination according to the selected communication method. According to the above-described configuration, the mounting area of the amplifying unit of the transmission device 1 may be reduced.

The level detecting unit 15 is mounted as a part of the PA module 3. If the level detecting unit 15 is modulated as a part of the PA module 3, the transmission device 1 may be downsized. The level detecting unit 15 may be mounted as a discrete part. If the level detecting unit 15 is mounted separately from the PA module 3, influence on level detection of the level detecting unit 15 due to the power noise caused by the operation of the PA module may be avoided.

Figure 2:
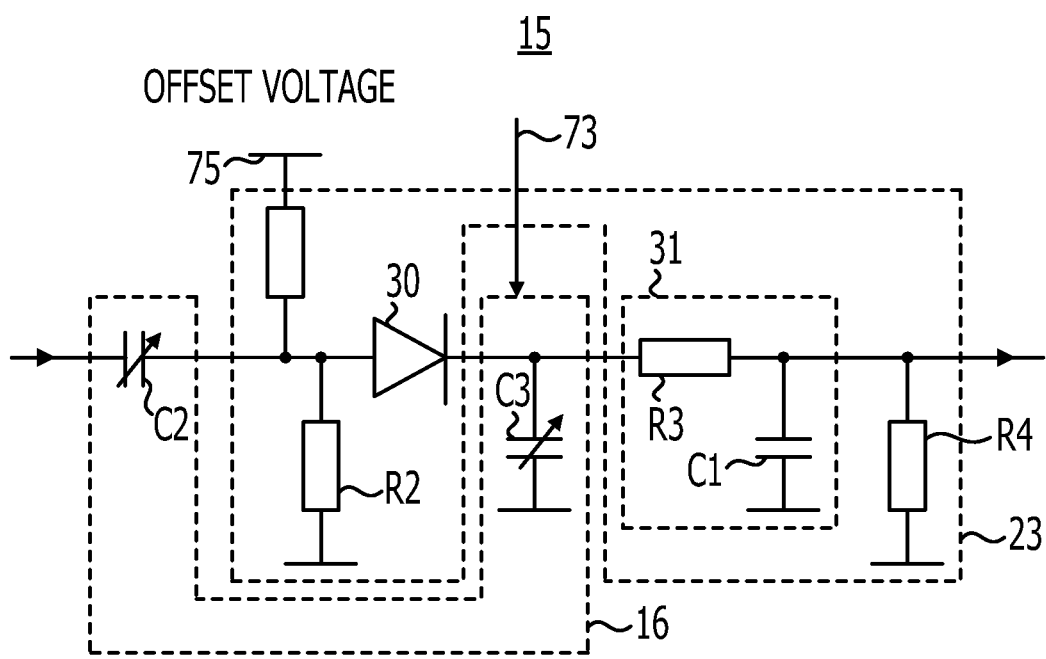
FIG. 2 is a detailed block diagram of a level detecting unit.

FIG. 2 is a detailed block diagram of the level detecting unit 15. The level detecting unit 15 includes an adjusting unit 16 and a detecting unit 23. The adjusting unit 16 adjusts the input impedance of the level detecting unit 15. The adjusting unit 16 is a part of the control unit 10. The adjusting unit 16 includes variable condensers C2 and C3 of which the capacity value is variable by an external unit. The detecting unit 23 includes resistances R1 and R2, a diode 30, a Low Pass Filter (LPF) 31, and a resistance R4.

According to the frequency of the signal that is input into the level detecting unit 15, the variable condenser C2 varies the current amount that is to be input into the diode 30. If the frequency of the signal is high, the current amount that is to be input into the detecting unit 23 becomes larger. The variable condenser C3 is output from the diode 30 and varies the current amount that is to be input into the LPF 31. If the frequency of the signal is high, the current amount that is input into the LPF 31 becomes smaller. If the combination of the capacity values of the variable condensers C2 and C3 is adjusted, the current amount that is to be input into the LPF 31 may be adjusted.

The residences R1 and R2 divide an offset voltage that is applied to a port 75. The standard voltage value of the voltage signal indicates the divided voltage value of the offset voltage. The standard voltage value is determined in consideration of a threshold value of a forward voltage of the diode 30.

From among the input voltage signals, the diode 30, as a detecting unit, detects a voltage signal that exceeds a threshold value of the forward voltage of the diode 30.

The LPF 31 removes the signal component that exceeds the cut-off frequency from the output of the diode 30. The LPF 31 includes a condenser C1. The cut-off frequency of the LPF 31 is determined based on the value of the resistance R3 and of the condenser C1.

The resistance R4 is coupled in parallel with the condenser C1. The voltage caused by a flow of the current output from the LPF 31 into the residence R4 is an output of the detecting unit 23.

According to the selected communication method, the power control unit 10B reads out the set values of the variable condensers C2 and C3 from the parameter table 50. The power control unit 10B outputs the read out set value to the PA control unit 10A. The PA control unit 10A outputs the set value output from the MUX 80 to the adjusting unit 16. The capacity value of the variable condensers C2 and C3 varies according to the set value output from the PA control unit 10A.

If the capacity value of the variable condensers C2 and C3 in the adjusting unit 16 is adjusted, the current value flowing in the resistance R4 varies. By adjusting the capacity value of the variable condensers C2 and C3 according to the communication method, the PA control unit 10A may adjust the output voltage value of the detecting unit 23.

Figure 3:
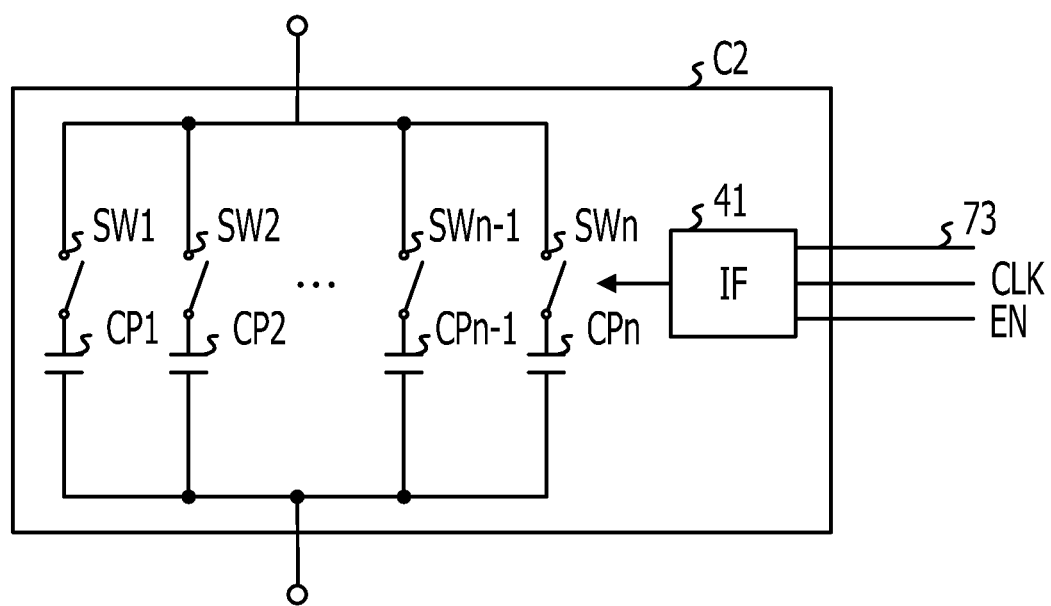
FIG. 3 is a block diagram of a condenser included in an adjusting unit.

FIG. 3 is a block diagram of the variable condenser C2 in the adjusting unit 16. The variable condensers C2 and C3 in the adjusting unit 16 have the similar configuration and the similar function. Therefore, the present embodiment describes the variable condenser C2, and the description of the variable condenser C3 will be omitted.

The variable condenser C2 varies the capacity value according to the control signal output from the PA control unit 10A. The variable condenser C2 includes switches SW1 to SWn, condensers CP1 to CPn, and an Interface (IF) 41. The switch SWn and the condenser CPn are coupled in parallel with each other. The switch SWn and the condenser CPn are coupled in series with each other. The switch SWn is turned on or off by a switch signal output from the IF 41. The capacity value of the variable condenser C2 is equal to the total capacity value of the condenser CPn that is coupled in series with the switch SWn that is turned on. By turning on or off the switch SWn if desired, the capacity value of the variable condenser C2 may be the desired capacity value. The value of the control signal corresponding to the capacity value of the variable condenser C2 is stored in the parameter table 50 for each communication method.

The IF 41 outputs the switch signal to each switch SWn according to the control signal output from the control unit 10. The IF specification that is applied to the IF 41 corresponds to the output interface specification of the control unit 10 that outputs the control signal. The IF specification is, for example, a Serial Peripheral Interface (SPI). Based on the input clock signal CLK, the IF 41 reads out the value of the control signal. If an enable signal EN that enables the control of the switch SWn is input, the IF 41 enables the switch signal that is to be output to each of the switches SWn. If the enable signal EN that disables the control of the switch SWn is input, the IF 41 outputs the switch signal that turns off all the switches SWn.

As described above, by using the variable condensers C2 and C3, which may set the capacity value due to the control signal from the outside, in the adjusting unit 16, the input impedance adjustment of the level detecting unit 15 may be achieved.

FIG. 4 is a parameter table diagram that is used to determine the input impedance of the level detecting unit 15. The parameter table 50 is stored in the storage unit 11. As described above, the parameter table 50 is read out when the communication method is selected. The parameter table 50 includes the set values of the variable condensers C2 and C3 according to each communication method. The capacity values of the variable condensers C2 and C3 indicated in the parameter table 50 are calculated in advance by the circuit simulation or the test. The frequency of the signal in the circuit simulation is a central frequency of the frequency band according to each communication method.

Lines 56, 57, and 58 indicate the capacity values of the variable condensers C2 and C3 that are to be set to the adjusting unit 16 when the frequency bands of each communication method are 800 MHz band, 2 GHz band, and 2.5 GHz band, respectively. Rows 52 and 53 indicate the capacity values of the variable condensers C2 and C3 in each communication method. A row 59 indicates correction values of graphs of the 2 GHz band and the 2.5 GHz band corresponding to the relation between the output power of the transmission device 1 and the output voltage of the level detecting unit 15. By adjusting the impedance of the level detecting unit 15 for each communication method, the graphs indicating the relation between the output power of the transmission device 1 and the output voltage of the level detecting unit 15 have the similar inclination and may have different sections. By adjusting the section at the time of shipping test, the graphs of the communication methods may be matched with each other. In the operation of the transmission device 1, the power control unit 10B adjusts the strength of the VGAs 12, 13, and 14 based on the correction value in the row 59.

Rows 54 and 55 are part of the conversion table 60. The rows 54 and 55 indicate a relation between the output power value of each of the amplifying units 17, 18, and 19 and the output voltage value of the level detecting unit 15. That is, after the variable condensers C2 and C3 of the adjustment unit 16 are set, if the voltage values output from the level detecting unit 15 indicate 1.5 V and 1.26 V, respectively, the rows 54 and 55 indicate that the output power values of the amplifying units 17, 18, and 19 are 26.5 dBm and 15 dBm, respectively.

For example, a procedure for setting the circuit parameter of the adjusting unit 16 by using the parameter indicated in the line 56 will be described below. Based on the control signal output from the PA control unit 10A, the amplifying unit 17 according to the amplitude of the modulation signal of 800 MHz is selected. To detect the output power value of the amplifying unit 17, the PA control unit 10A sets the capacity amount value of the variable condensers C2 and C3 of the adjusting unit 16 to 1.5 pF and 0.45 pF, respectively.

After the capacity value is set, the output voltage value of the level detecting unit 15 is 1.5 V. In this case, based on the conversion table 60, the power control unit 10B converts the output voltage value 1.5 V of the level detecting unit 15 into the output power value 26.5 dBm of the amplifying unit 17. If the output voltage value of the level detecting unit 15 is 1.26 V, the power control unit 10B converts the output voltage value 1.26 V into the output power value 15 dBm of the amplifying unit 17 based on the conversion table 60. As described above, if the circuit parameter of the adjusting unit 16 is set according to the selected communication method, the power control unit 10B may convert the output voltage value of the level detecting unit 15 into the output power value of the amplifying unit based on the conversion table 60 regardless of the communication method.

FIG. 5 illustrates a relation between the output power value of the amplifying units 17, 18, and 19 and the output voltage value of the level detecting unit 15. FIG. 5A is a graph indicating a relation between the power value output from the amplifying units 17, 18, and 19 and the output voltage value output from the level detecting unit 15. FIG. 5B is the conversion table 60 that indicates several points selected from the graph illustrated in FIG. 5A.

The horizontal axis in FIG. 5A indicates the output power value of the amplifying unit according to the selected communication method. The vertical axis in FIG. 5A indicates the output voltage value of the level detecting unit 15 when the level detecting unit 15 detects the output power value in each communication method. In FIG. 5A, the relation between the output power value of each of the amplifying units 17, 18, and 19 and the output voltage value of the level detecting unit 15 remains substantially the same.

If the circuit parameter of the adjusting unit 16 is fixed regardless the communication method, the input impedance of the level detecting unit 15 has a frequency dependency. Thus, the relation between the output voltage value of the level detecting unit 15 and the output power value of each of the amplifying units varies according to the communication method.

On the contrary, according to the present embodiment, the input impedance of the level detecting unit 15 is adjusted according to the communication method so that the relation between the output power values of the amplifying units 17, 18, and 19 and the output voltage value of the level detecting unit 15 as illustrated in FIG. 5A.

The conversion table 60 illustrated in FIG. 5B is stored in the storage unit 11. The conversion table 60 includes rows 61 and 62. The row 61 indicates the output power value according to each communication method selected from the graph illustrated in FIG. 5A. The row 62 indicates the output voltage value of the level detecting unit 15 with respect to the output power value of the amplifying unit according to the selected communication method. In the conversion table 60 illustrated in FIG. 5B, the lines 63 to 67 indicate the output power values of the amplifying unit and the output voltage values of the level detecting unit 15 corresponding to each of the output power values.

Based on the output voltage value of the level detecting unit 15, the power control unit 10B refers to the conversion table 60. The power control unit 10B converts the output voltage value of the level detecting unit 15 into the output power value of the amplifying unit. Even if the conversion table 60 does not include the output voltage value of the level detecting unit 15, the power control unit 10B may convert the output voltage value of the level detecting unit 15 into the output power value by interpolation calculation based on the conversion table 60. If the period of the output power operations of the conversion table 60 is small, the generation rate of the interpolation calculation may be decreased.

FIG. 6 is a flow diagram of shipping test processing of the transmission device 1 by the test device 85. FIG. 6A is a flow diagram of the shipping test processing of the transmission device 1 in a case where the first communication method is selected. FIG. 6B is a flow diagram of the shipping test processing of the transmission device 1 in a case where the second communication method and the following communication method are selected. The processing illustrated in FIG. 6 is stored as a test program 97 in a storage unit 92 of the test device 85. By executing the test program 97, the test device 85 achieves the shipping test processing illustrated in FIG. 6.

The test device 85 illustrated in FIG. 6A outputs a test signal that sets the first communication method and the output power value to the calculating unit 88 in the transmission device 1 (S10). According to the communication method set by the test signal, the calculating unit 88 into which the test signal is input outputs the PA set signal and the selection signal to the PA control unit 10A and outputs the power set signal to the power control unit 10B. The power control unit 10B reads out the set value of the parameter table 50 and outputs the set value to the PA control unit 10A. The PA control unit 10A outputs the input set value as a control signal to the level detecting unit 15 and sets the input impedance of the level detecting unit 15 (S11).

The power control unit 10B sets the output power value based on the input power set signal (S12). The power control unit 10B outputs the control signal based on the output voltage value and on the set value of the output power of the level detecting unit 15 and controls the output power values of the amplifying units 17, 18, and 19 (S13).

The output power of the amplifying units 17, 18, and 19 is output from the switch 7 through the directional coupling units 20, 21, and 22, and filters 4, 5, and 6. The tester 86 measures the power value output from the switch 7 (S14). The tester 86 outputs the power measurement result to the test device 85.

The test device 85 compares the output power value that is set to the transmission device 1 to the power value that is output from the tester 86. If the set output power value is different from the power value output from the tester 86, the test device 85 corrects the value of the conversion table 96 stored in a memory 91 (S15).

According to the communication method selected first, the test device 85 repeats the processing from S12 to S15 regarding a plurality of power values (NO in S16). If the test of all the power set values determined in advance is completed (YES in S16), the test device 85 corrects the conversion table 96 regarding the plurality of power set values and then outputs the data of the corrected conversion table 96 to the IF 87. The calculating unit 88 writes the data of the conversion table 96 received through the IF 87 in the memory 89 (S17).

In this manner, the test device 85 may correct the conversion table of the transmission device 1.

In FIG. 6B, the test device 85 outputs the test signal that sets the second communication method and the output power value to the calculating unit 88 of the transmission device 1 (S20). According to the set communication method, the calculating unit 88 into which the test signal is input outputs the PA set signal and the selection signal to the PA control unit 10A and outputs the power set signal to the power control unit 10B. The power control unit 10B reads out the set value of the parameter table 50 from the storage unit 11 and outputs the set value to the PA control unit 10A. The PA control unit 10A outputs the input set value to the level detecting unit 15 and adjusts the input impedance of the level detecting unit 15 (S21).

Based on the input power setting signal, the power control unit 10B sets the output power value (S22). Based on the output voltage value of the level detecting unit 15 and on the set value of the output power, the power control unit 10B outputs the control signal to control the output power values of the amplifying units 17, 18, and 19 (S23).

The output power of the amplifying units 17, 18, and 19 are output from the switch 7 through the directional coupling units 20, 21, and 22, and the filters 4, 5, and 6. The tester 86 measures the power value output from the switch 7 (S24). The tester 86 outputs the power measurement result to the test device 85.

The test device 85 compares the difference between the output power value that is set to the transmission device 1 and the power value that is input from the tester 86 to the acceptable value of the difference that is set in advance (S25). If the error is equal to or lower than the acceptable value (YES in S25), the test device 85 writes the set value of the input impedance in the parameter table 98 of the test device 85 (S26).

If the error is larger than the acceptable value (NO in S25), the test device 85 adjusts the output power by a strength change of the VGA (S23) and measures the output power again (S24). Until the error becomes equal to or lower than the acceptable value, the processing of S23 and S24 is repeated. If the error becomes equal to or lower than the acceptable value after being corrected (YES in S25), the test device 85 writes the set value of the VGA in the parameter table 98 (S26).

Even in the third communication method or the following communication methods, the test that is similar to the test performed in the second communication method is performed. After completing the adjusting processing of the VGA in all the communication methods, the test device 85 outputs the data of the corrected parameter table 98 to the IF 87. The calculating unit 88 writes the data of the parameter table 98, which is received through the IF 87, in the memory 89.

The calculating unit 88 overwrites a conversion table 96 and the parameter table 98 written in the memory 89 on the conversion table 60 and the parameter table 50 stored in the storage unit 11.

In this manner, by adjusting the input impedance of the level detecting unit 15 according to the communication method, the test device 85 may simplify the test of the output power according to the second communication method or the following methods compared to the test according to the first communication method. Even if the number of the communication methods that are switchable in the transmission device 1 is increased, the test device 85 may simplify the adjusting processing of the transmission device.

Figure 7:
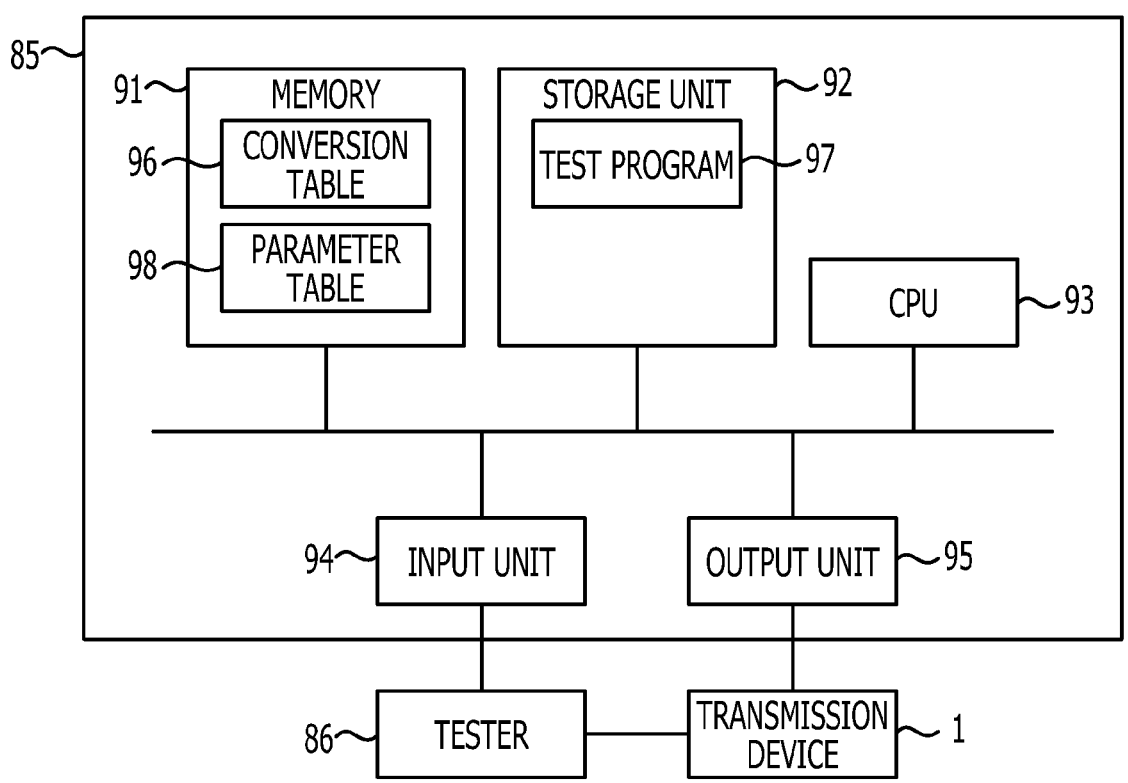
FIG. 7 is a block diagram of the test device.

FIG. 7 is a block diagram of the test device 85. The test device 85 includes a Central Processing Unit (CPU) 93, the storage unit 92, the memory 91, an input unit 94, and an output unit 95. The storage unit 92 stores the test program 97. The memory 91 stores the conversion table 96.

The test program 97 is executed to process the shipping test of the transmission device 1. By executing the test program 97 stored in the storage unit 92, the CPU 93 performs the shipping test processing of the transmission device 1. The conversion table 96 includes the output voltage value of the level detecting unit 15 and the output power values of the amplifying units 17, 18, and 19 that are corrected based on the results of the shipping test processing. After completing the test according to the communication method that is selected first, the CPU 93 writes the conversion table 96 in the memory 89 of the transmission device 1.

The input unit 94 is a device that outputs an instruction code to the CPU 93. The input unit 94 is, for example, a keyboard or a mouse. The input unit 94 is an interface that inputs a measurement result from the tester 86 to the test device 85. The output unit 95 is a device that outputs a processing result of the CPU 93 to the outside of the test device 85. The output unit 95 is, for example, a monitor or a printer. The output unit 95 is an interface that outputs a set value of the shipping test, information stored in the memory 91, and the like to the transmission device 1.

In this manner, by executing the test program 97, the test device 85 may process the shipping test of the transmission device 1.

An aspect of the embodiment is to provide a transmission device that simplifies the adjustment of the output power at the shipping even through the transmission device may correspond to a plurality of communication methods.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A transmission device, comprising:
an amplifier configured to amplify and output a modulation signal;
a detecting circuitry coupled to the amplifier, configured to detect an output power of the amplifier; and
a processing circuitry coupled to the detecting circuitry, configured to:
change the output power of the amplifier based on an output of the detecting circuitry; and
control an input impedance of the detecting circuitry based on each communication method,
wherein, the processing circuitry is configured to:
compare the output voltage of the detecting circuitry to a target value which is set in advance, and
set the output power in such a way that the output from the amplifier gets larger until the output voltage value of the detecting circuitry becomes the target value.

2. The transmission device according to claim 1, further comprising:
a storage configured to store a set value of the input impedance for each of the communication methods; and wherein
the processing circuitry is configured to read out the set value of the input impedance corresponding to the communication method from the storage, and adjust the input impedance of the detecting circuitry based on the read set value.

3. The transmission device according to claim 1, wherein the detecting circuitry includes:
a diode configured to detect a voltage signal that is equal to or higher than a threshold value from among the output of the amplifier; and a filter configured to remove a component which is equal to or higher than a certain frequency from the detected voltage signal, and
wherein the processing circuitry includes:
a first variable condenser configured to increase a current amount to be input to the diode as the frequency of the voltage signal to be input to the detecting circuitry increases, and
a second variable condenser configured to decrease a current amount to be input to the filter as the frequency of the voltage signal to be input to the detecting circuitry increases, and
the transmission device further comprising:
a storage configured to store capacity values of the first variable condenser and the second variable condenser, and wherein
the processing circuitry is configured to adjust the input impedance of the detecting circuitry by changing the capacities of the first variable condenser and the second variable condenser in such a way that the capacities correlate with the capacity values of the first variable condenser and the second variable condenser which are read out from the storage according to each communication method.

4. A method of adjusting an amplitude of a transmission device, the method comprising:
amplifying and outputting a demodulation signal using an amplifier;
detecting an output power of the amplifier using detecting circuitry coupled to the amplifier; and
changing amplifier based on output of the detecting circuitry using a processing circuitry coupled to the detecting circuitry;
comparing the output voltage of the detecting circuitry to a target value which is set in advance, and
setting the output power in such a way that the output from the amplifier gets larger until the output voltage value of the detecting circuitry becomes the target value; and
controlling an input impedance of the detecting circuitry based on each communication method using the processing circuitry.

5. The transmission device according to claim 2,
wherein the processing circuitry includes a variable condenser coupled to the detecting circuitry, and
wherein the processing circuitry is configured to adjust the input impedance by varying capacity of the variable condenser according to the read set value.

6. The method of claim 4, further comprising:
storing a set value of the input impedance for each of the communication methods in a storage;
reading out the set value of the input impedance corresponding to the communication method from the storage using the processing circuitry; and
adjusting the input impedance of the detecting circuitry based on the read set value using the processing circuitry.

7. The method of claim 4, wherein the detecting circuitry includes:
a diode configured to detect a voltage signal that is equal to or higher than a threshold value from among the output of the amplifier; and
a filter configured to remove a component which is equal to or higher than a certain frequency from the detected voltage signal, and wherein the processing circuitry includes:
a first variable condenser configured to increase a current amount to be input to the diode as the frequency of the voltage signal to be input to the detecting circuitry increases, and
a second variable condenser configured to decrease a current amount to be input to the filter as the frequency of the voltage signal to be input to the detecting circuitry increases, and
the method further comprising:
storing capacity values of the first variable condenser and the second variable condenser in a storage, and
wherein the processing circuitry is configured to control and adjust the input impedance of the detecting circuitry by changing the capacities of the first variable condenser and the second variable condenser in such a way that the capacities correlate with the capacity values of the first variable condenser and the second variable condenser which are read out from the storage according to the each communication method.

8. The method according to claim 5,
wherein the processing circuitry includes a variable condenser coupled to the detecting circuitry, and
wherein the processing circuitry is configured to adjust the input impedance by varying capacity of the variable condenser according to the read set value.

* * * * *